United States Patent

Nakamura

[11] Patent Number: 5,832,036
[45] Date of Patent: Nov. 3, 1998

[54] RADIO RELAY APPARATUS

[75] Inventor: Tomohiro Nakamura, Kawasaki, Japan

[73] Assignee: Fujitsu Limited, Kanagawa, Japan

[21] Appl. No.: 686,166

[22] Filed: Jul. 24, 1996

[30] Foreign Application Priority Data

Jan. 30, 1996 [JP] Japan ................................ 8-013451

[51] Int. Cl.$^6$ .................................................. H04B 3/36
[52] U.S. Cl. .................... 375/211; 375/214; 375/226; 370/243; 370/506; 370/516; 371/51.1
[58] Field of Search ................................ 375/211, 214, 375/226; 455/7, 11.1, 13.1, 15; 379/338, 341; 370/243, 506, 509, 516, 535; 371/1, 20.2, 49.1, 51.1

[56] References Cited

U.S. PATENT DOCUMENTS 4,783,791  11/1988  Yoshino ................................ 375/211
4,937,812   6/1990  Itoh et al. ............................. 375/211
5,479,443  12/1995  Kagami et al. ...................... 375/211

Primary Examiner—Don N. Vo
Attorney, Agent, or Firm—Helfgott & Karas, PC.

[57] ABSTRACT

A radio relay apparatus complying with SDH is provided which permits the value of B2 bytes received from a transmitting-side terminal station to be sent to a receiving-side terminal station even in the case where resetting of a pointer value is performed. B2 sampling means of the radio relay apparatus samples B2 byte information, and B2 recomputing means again performs B2 parity computation of received transmission information which has been subjected to the pointer value resetting. Adding means adds bit by bit the data sampled by the B2 sampling means to the data obtained by the B2 recomputing means, and transmitting means transmits the sum obtained by the adding means to a subsequent radio relay apparatus. Based on the sum transmitted from the transmitting means, the subsequent radio relay apparatus judges that data which is a subject of B2 parity computation and which corresponds to a bit having the value "1" is erroneous.

8 Claims, 9 Drawing Sheets

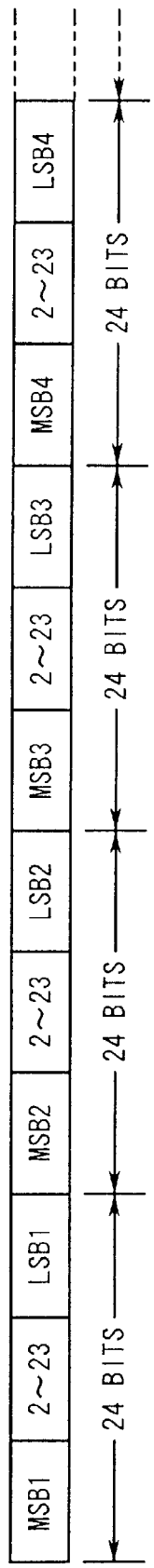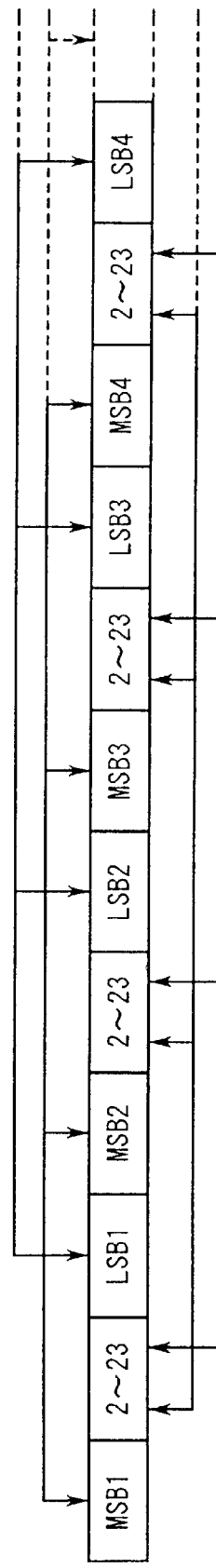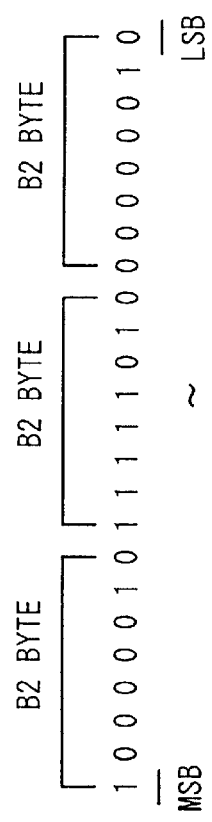
FIG. 3 (A)
FIG. 3 (B)
FIG. 3 (C)

RADIO RELAY APPARATUS

BACKGROUND OF THE INVENTION

(1) Field of the Invention

The present invention relates to a radio relay apparatus complying with SDH (Synchronous Digital Hierarchy), and more particularly, to a radio relay apparatus for use as a radio relay system which takes charge of a relay interval of an optical transmission system complying with SDH.

(2) Description of the Related Art

FIG. 8 is a diagram illustrating the configuration of an optical transmission system including such a radio relay system. In FIG. 8, multi-channel optical signals are transmitted from a transmission terminal station 101 to a radio relay apparatus 102, which then multiplexes the signals and transmits the resultant signal as a radio signal to another radio relay apparatus 104 via an intermediate relay station 103. The radio relay apparatus 104 demultiplexes the received signal and transmits the resultant multi-channel optical signals to a transmission terminal station 105. Transmission/reception of a control signal using MSOH (Multiplex Section OverHead) is carried out between the transmission terminal stations 101 and 105, and transmission/reception of a control signal using RSOH (Regenerator Section OverHead) is carried out between the radio relay apparatuses 102 and 104.

In the radio relay apparatus 102, multi-channel optical signals are first converted to electrical signals and then multiplexed; generally, however, since the frames of data of the individual channels are out of phase with each other, their phases must be synchronized before the multiplexing. Such a phase synchronizing or locking method will be explained with reference to FIG. 9.

FIG. 9 is a diagram illustrating the configuration of a conventional optical transmission system. This optical transmission system is identical in configuration with that shown in FIG. 8, and therefore, identical reference numerals are used to designate identical elements.

The radio relay apparatus 102 comprises a data receiving section 102a, a pointer processing section 102b, a B2 recomputing section 102c, etc., and among these elements, the pointer processing section 102b performs the frame phase locking. Specifically, the pointer processing section 102b compares the head position of received data stored in a payload with a reference position of transmission frame to detect a deviation of the head position from the reference position, and stores the detected deviation (pointer value) in a predetermined location of the overhead. Since the head position of the received data is readily identifiable based on the pointer value, in the subsequent multiplexing process the frames can be processed as if they are actually in phase with each other. Thus, it is not necessary to temporarily store received data in a frame buffer so that it may later be read out in synchronism with the reference position of transmission frame. In general, data received by the radio relay apparatus 102 already has a pointer value set therein, and therefore, the additional setting of the pointer value performed prior to the multiplexing process as mentioned above is, in fact, a resetting of the pointer value.

As a result of the frame phase locking thus carried out by the pointer processing section 102b, the head position of the received data shifts relative to the transmission frame. Thus, even if there is no transmission code error caused between the transmission terminal stations 101 and 105, B2 bytes, which are used to monitor a transmission code error occurring between the transmission terminal stations 101 and 105, take different values before and after the frame phase locking. In view of this, the B2 recomputing section 102c is provided to perform B2 parity computation again for the received data which has been subjected to the frame phase locking.

However, the value of the B2 bytes obtained as a result of the B2 parity recomputation by the B2 recomputing section 102c is a value which is computed by using, as a subject of parity check, the data received by the radio relay apparatus 102. On the other hand, the value of the B2 bytes included in the data received by the radio relay apparatus 102 and sampled in the same apparatus is a value which is computed by using, as a subject of parity check, the data transmitted from the transmission terminal station 101. Accordingly, if a transmission code error has occurred midway on the transmission path from the transmission terminal station 101 to the radio relay apparatus 102, then the above two values of B2 bytes are naturally different from each other. In such a case, the result of the parity check obtained from the recomputation by the B2 recomputing section 102c is invalid, because the result of the parity check performed on the data transmitted from the transmission terminal station 101 should originally be sent to the transmission terminal station 105.

SUMMARY OF THE INVENTION

An object of the present invention is to provide a radio relay apparatus which permits the value of B2 bytes, which is received from a transmitting-side terminal station, to be sent to a receiving-side terminal station even in the case where resetting of a pointer value is performed.

To achieve the above object, a radio relay apparatus complying with SDH is provided. The radio relay apparatus comprises B2 sampling means for sampling B2 byte information included in transmission information sent from a transmission terminal station, B2 recomputing means for performing B2 parity computation again for the transmission information, adding means for adding bit by bit the data sampled by the B2 sampling means to data obtained by the B2 recomputing means, and transmitting means for transmitting a sum obtained by the adding means to a subsequent radio relay apparatus.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 3(A), 3(B) and 3(C) are diagrams illustrating B2 byte information;

DESCRIPTION OF THE PREFERRED EMBODIMENTS

The present invention is directed to a radio apparatus that complies with the well known Synchronous Digital Hierarchy (SDH) interface standard. SDH is an international standard for the digital transmission system established in 1988 by CCITT (The International Telegraph and Telephone Consultative Committee) which is now called ITU-T (International Telecommunication Union-Telecommunication Sector). SDH prescribes an interface for effectively multiplexing various high-speed transmission services and existing low-speed transmission services.

Embodiments according to the present invention will be hereinafter described with reference to the drawings.

Figure 1:
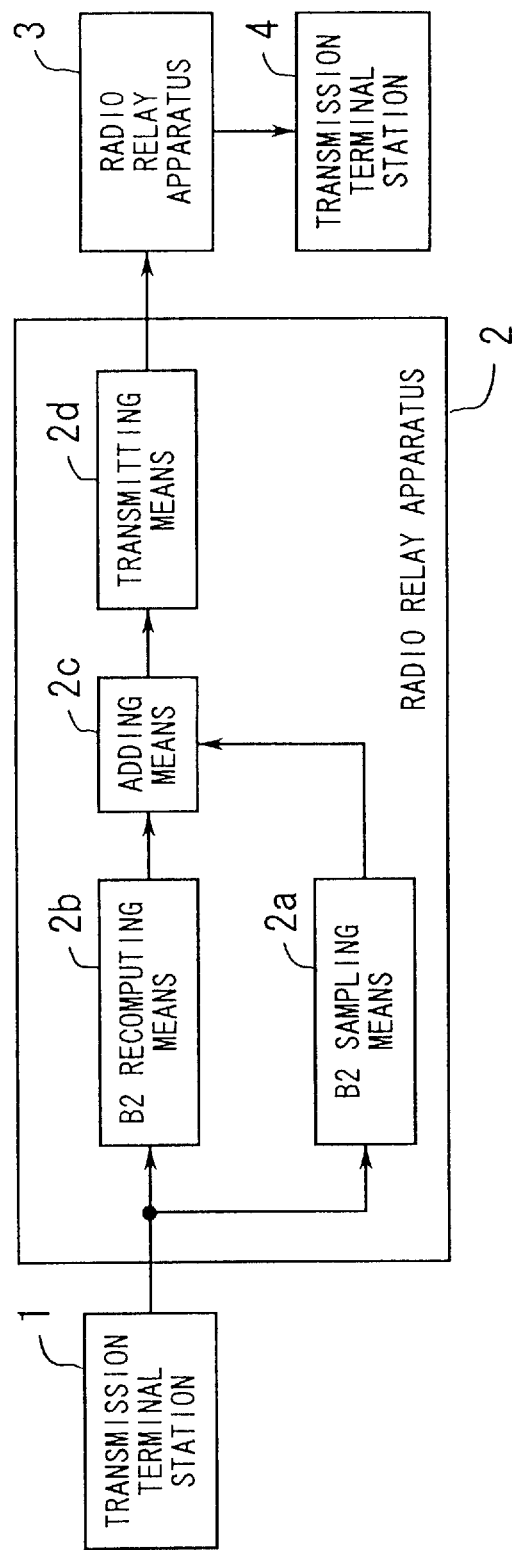
FIG. 1 is a diagram illustrating the principles of the present invention.

Referring first to FIG. 1, a theoretical arrangement according to a first embodiment will be explained. The first embodiment comprises B2 sampling means 2a for sampling B2 byte information included in transmission information sent from a transmission terminal station 1, B2 recomputing means 2b for performing B2 parity computation again for the transmission information, adding means 2c for adding bit by bit the data sampled by the B2 sampling means 2a to data obtained by the B2 recomputing means 2b, and transmitting means 2d for transmitting the sum obtained by the adding means 2c to a subsequent radio relay apparatus 3.

Figure 2:
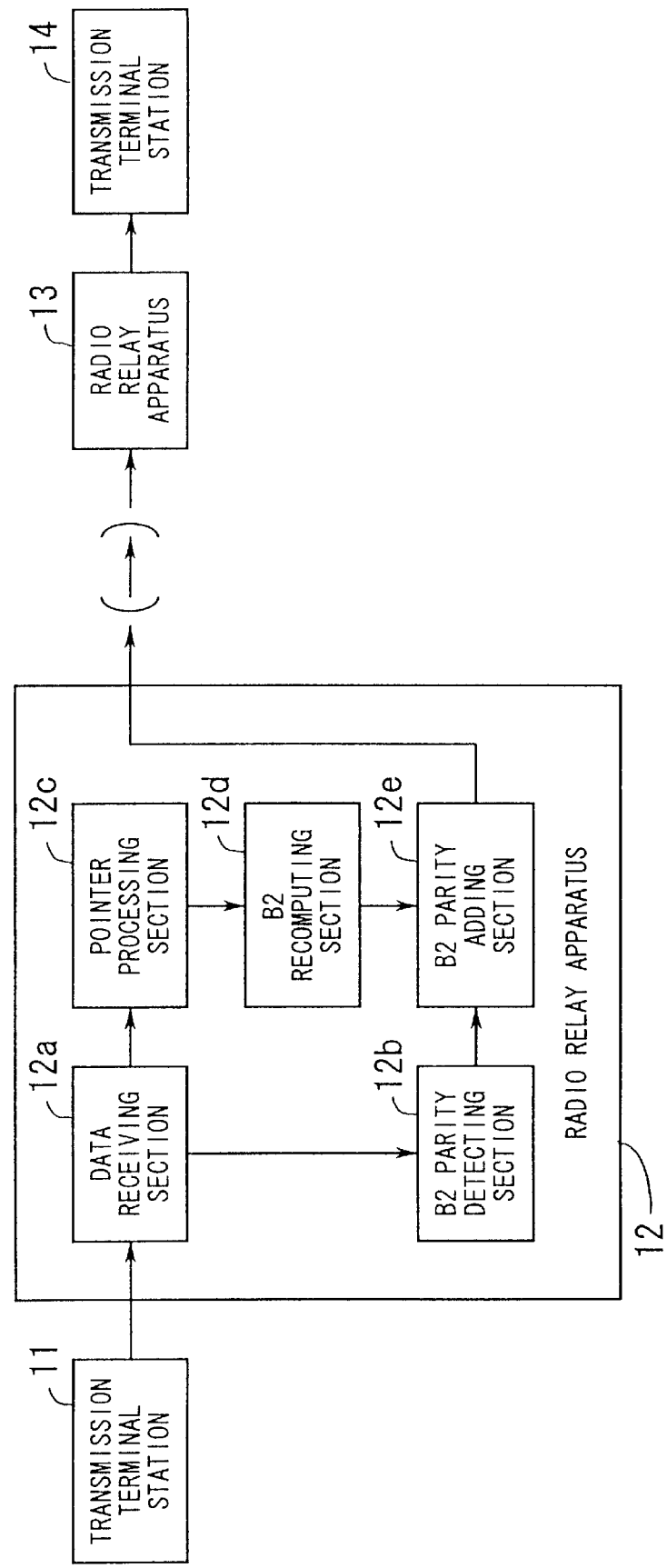
FIG. 2 is a block diagram showing details of an arrangement according to a first embodiment.

FIG. 2 is a block diagram showing details of an arrangement according to the first embodiment. The B2 sampling means 2a in FIG. 1 corresponds to a B2 parity detecting section 12b in FIG. 2, the B2 recomputing means 2b in FIG. 1 corresponds to a B2 recomputing section 12d in FIG. 2, the adding means 2c in FIG. 1 corresponds to a B2 parity adding section 12e in FIG. 2, and the transmitting means 2d in FIG. 1 corresponds to a radio relay apparatus 12 in FIG. 2. Further, the transmission terminal station 1, radio relay apparatuses 2 and 3, and transmission terminal station 4 in FIG. 1 correspond, respectively, to a transmission terminal station 11, radio relay apparatuses 12 and 13, and transmission terminal station 14 in FIG. 2.

In FIG. 2, the radio relay apparatus 12 comprises, as components relating to the present invention, a data receiving section 12a, the B2 parity detecting section 12b, a pointer processing section 12c, the B2 recomputing section 12d, the B2 parity adding section 12e, etc. The data receiving section 12a receives transmission signals sent from the transmission terminal station 11, and the B2 parity detecting section 12b samples the B2 byte information included in the received transmission signals.

FIGS. 3(A), 3(B) and 3(C) are diagrams illustrating the B2 byte information, wherein a monitoring method based on STM-1 and BIP-24 is employed. FIG. 3(A) shows the entire information of one frame except the upper three lines of a section overhead, and this information is divided into segments each consisting of 24 bits. The transmission terminal station 11 first performs an even parity computation for only the first bits (MSB) of the individual segments, as shown in FIG. 3(B), and inserts the result in the first bit (MSB) of the first one of three B2 bytes, as shown in FIG. 3(C). Then, an even parity computation is performed for only the second bits of the individual segments, and the result is inserted in the second bit of the first one of the three B2 bytes, followed by repetition of similar computation with respect to the succeeding bits. Finally, an even parity computation is performed for only the 24th bits of the individual segments, and the result is inserted in the eighth bit (LSB) of the last one of the three B2 bytes. Thus, parity computation is performed for every information bit of one frame except the upper three lines of the section overhead, and the result is transmitted from the transmission terminal station 11 by means of three B2 bytes. Where the result of computation is "100 . . . 010" as shown in FIG. 3(C), for example, the B2 parity detecting section 12b samples this computation result.

Referring again to FIG. 2, the pointer processing section 12c carries out resetting of a pointer value prior to a multiplexing process (which is, though not shown, performed within the radio relay apparatus 12 subsequently to the B2 parity adding section 12e). More specifically, the head position of the received data stored in a payload is compared with a reference position of transmission frame to detect a deviation of the head position from the reference position, and the detected deviation (pointer value) is stored in a predetermined location of the overhead.

Then, the B2 recomputing section 12d performs B2 parity recomputation with respect to the received transmission signal. It is here assumed that the recomputation provides data shown in FIGS. 4(A) and 4(B), or more specifically, FIG. 4(A) shows the B2 byte information sent from the transmission terminal station 11 and sampled by the B2 parity detecting section 12b whereas FIG. 4(B) shows the result of recomputation obtained by the B2 recomputing section 12d. As seen from FIGS. 4(A) and 4(B), the two differ from each other in the seventh, 14th, 16th, 23rd and 24th bits. This may probably be because data which is a subject of parity computation and which corresponds to these bits has undergone interference on the transmission path from the transmission terminal station 11 to the radio relay apparatus 12.

Figure 4:
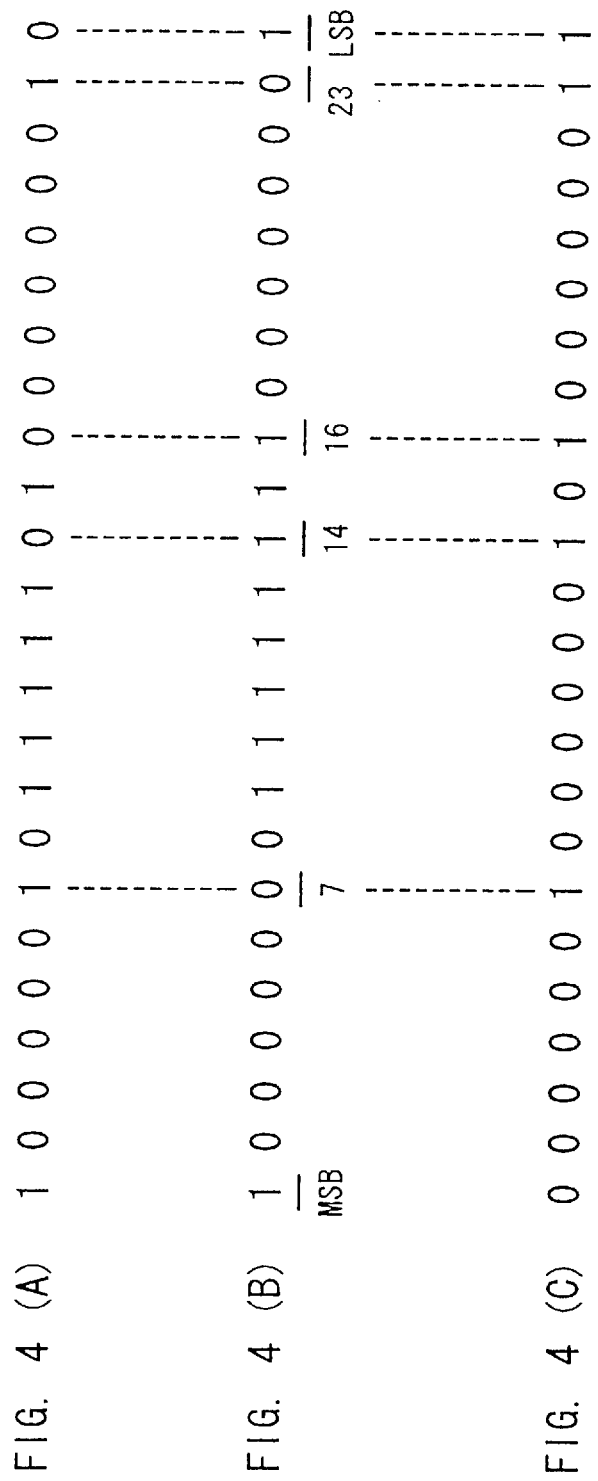
FIGS. 4(A), 4(B) and 4(C) are diagrams showing various B2 bytes and their differences.

The B2 parity adding section 12e shown in FIG. 2 adds, on a bit-by-bit basis, the B2 byte information sampled by the B2 parity detecting section 12b to the result of computation obtained by the B2 recomputing section 12d. Specifically, the B2 byte information shown in FIG. 4(A) is added bit by bit to the result of recomputation shown in FIG. 4(B). This addition is performed by a method in which only the LSB of the result of binary addition is employed, as in "1+1=0". In the example of FIG. 4, the result of such binary addition is shown in FIG. 4(C).

The radio relay apparatus 12 shown in FIG. 2 transmits this result of addition, together with the result of recomputation by the B2 recomputing section 12d, to the subsequent radio relay apparatus 13. Before the transmission, the radio relay apparatus 12 carries out a multiplexing process, which is not described herein.

The radio relay apparatus 13 can obtain the original B2 byte information (FIG. 4(A)) by adding the result of addition (FIG. 4(C)) to the result of recomputation (FIG. 4(B)). Alternatively, the result of addition and the result of recomputation may be sent up to the transmission terminal station 14 so that the original B2 byte information (FIG. 4(A)) may be obtained at the station 14.

A second embodiment of the invention will be now described.

Figure 5:
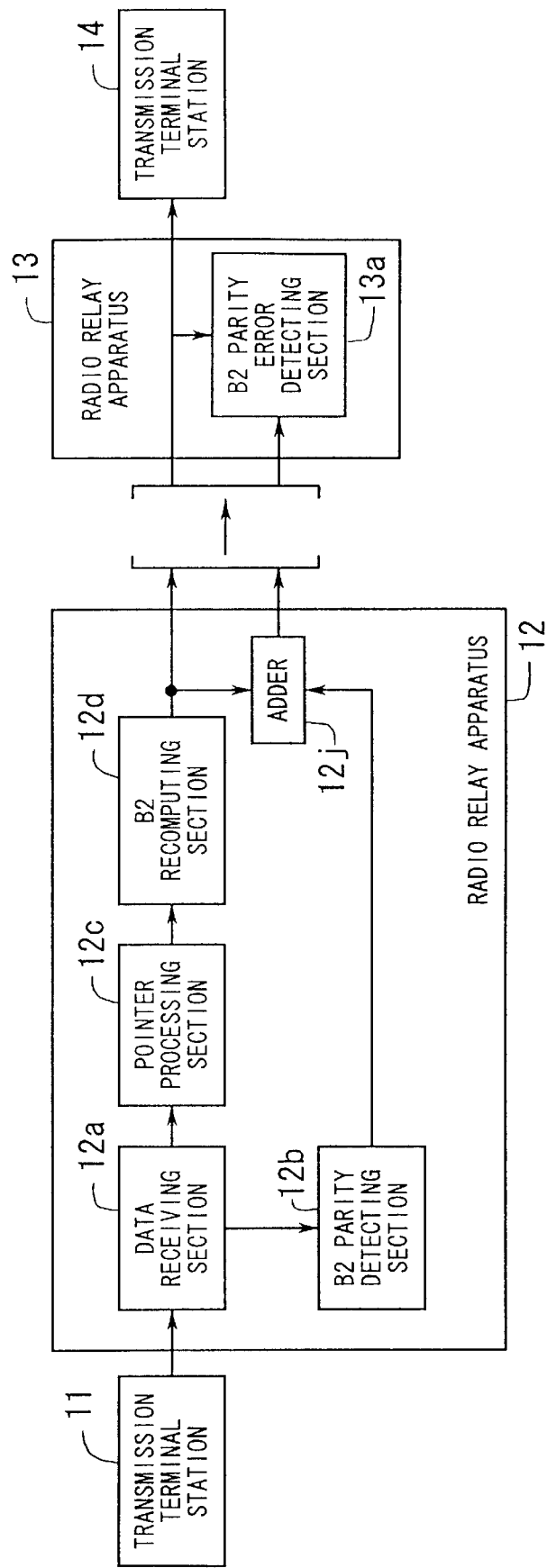
FIG. 5 is a diagram showing an arrangement according to a second embodiment.

FIG. 5 is a diagram showing the second embodiment. The arrangement of the second embodiment is basically identical with that of the first embodiment; therefore, identical reference numerals are used to designate identical elements and a description of such elements is omitted.

In the second embodiment, when the B2 byte information sampled by the B2 parity detecting section 12b is normal, an adder 12j adds a value to the result of recomputation obtained by the B2 recomputing section 12d so that the B2 parity may be unchanged, and when the B2 byte information is erroneous, the adder 12j adds a value to the result of recomputation from the B2 recomputing section 12d so that the B2 parity may be inverse, the result of the addition being transmitted to a B2 parity error detecting section 13a of the radio relay apparatus 13. The B2 parity error detecting section 13a is also supplied with the result of recomputation from the B2 recomputing section 12d.

In the B2 parity error detecting section 13a of the radio relay apparatus 13, the output from the adder 12j, that is, the B2 parity after the addition, is compared with the result of recomputation from the B2 recomputing section 12d, that is, the B2 parity before the addition, and the information is judged to be normal if the B2 parity is unchanged, and is judged to be erroneous if the B2 parity is inverse.

A third embodiment of the invention will be described.

Figure 6:
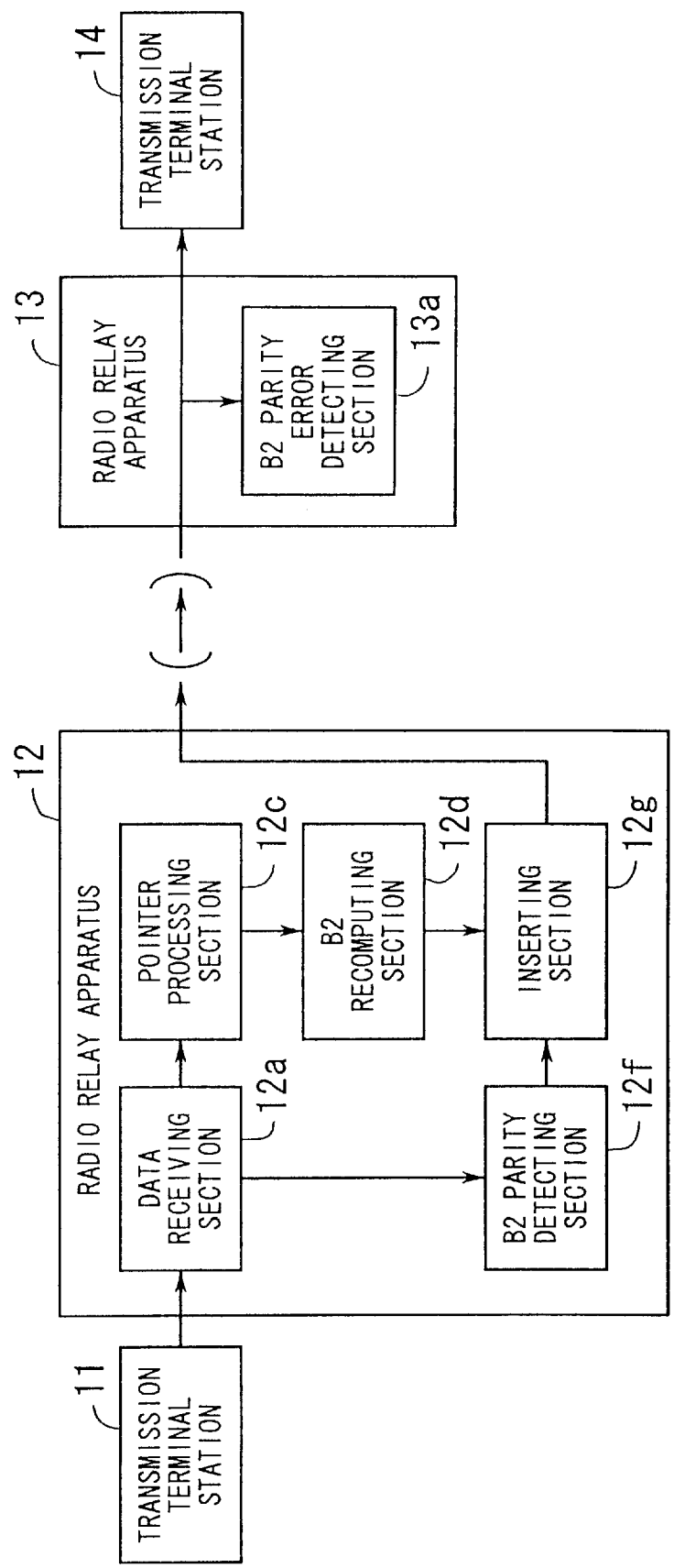
FIG. 6 is a diagram showing an arrangement according to a third embodiment.

FIG. 6 is a diagram showing the third embodiment. The arrangement of the third embodiment is basically identical with that of the first embodiment; therefore, identical reference numerals are used to designate identical elements and a description of such elements is omitted.

In the third embodiment, a B2 parity detecting section 12f samples B2 byte information from the received transmission signal. The sampled data is supplied to an inserting section 12g, which then inserts the data into vacant bytes of data which is the result of recomputation, so that the sampled data is transmitted, together with the result of recomputation, to the radio relay apparatus 13.

In the radio relay apparatus 13, a B2 parity error detecting section 13a samples the data shown in FIG. 4(C) from the transmitted signal. Each bit of the sampled data is checked, and if the values of all bits are "0", the result of recomputation is regarded as normal; if any of the bits has the value "1", it is judged that the data which is a subject of B2 parity computation and which corresponds to the bit concerned is erroneous.

A fourth embodiment of the invention will be now described.

Figure 7:
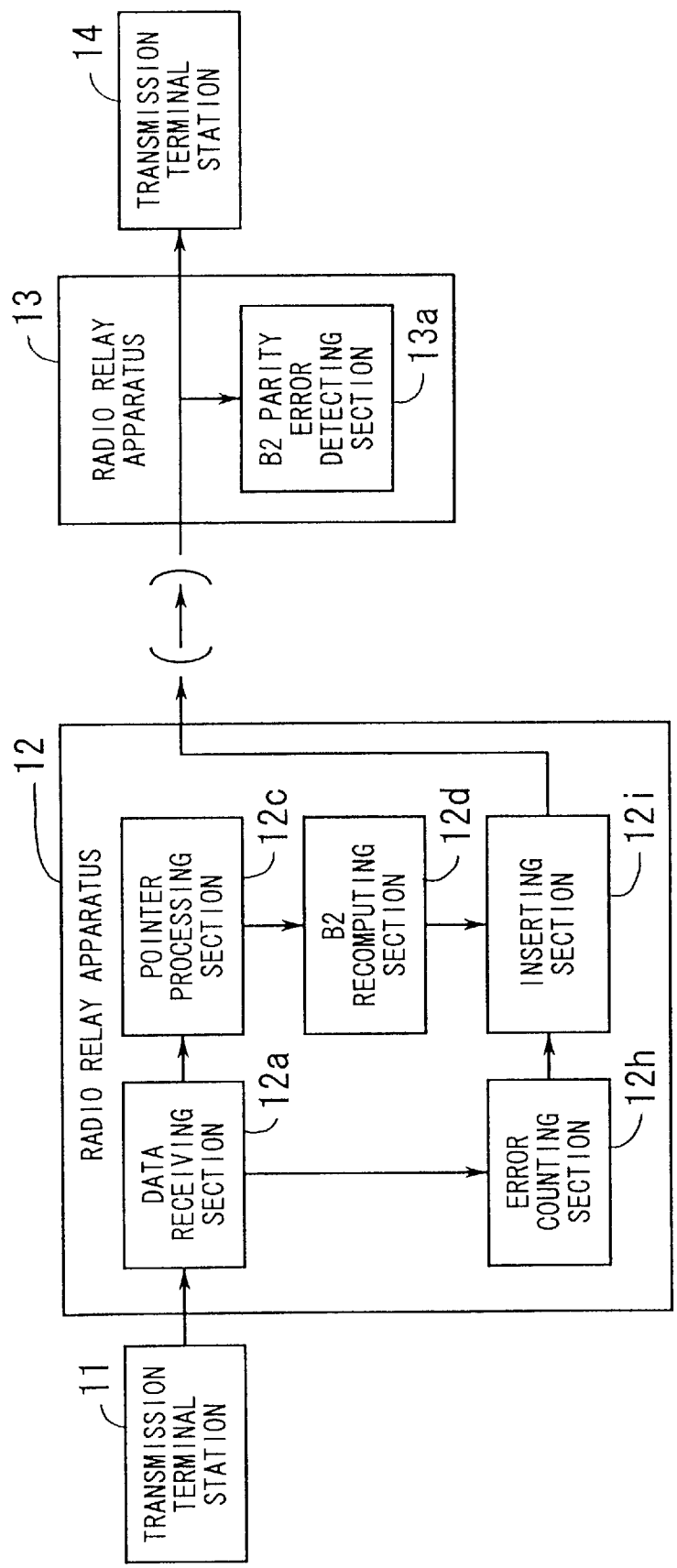
FIG. 7 is a diagram showing an arrangement according to a fourth embodiment.
Figure 8:
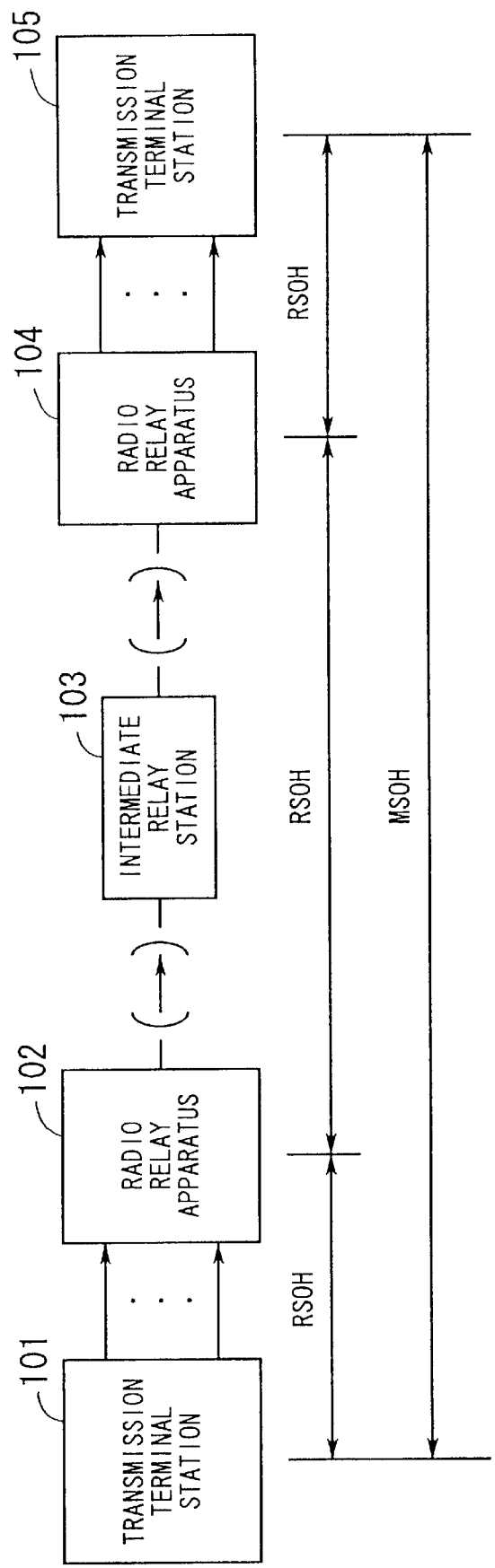
FIG. 8 is a diagram showing the configuration of an optical transmission system including a radio relay system.
Figure 9:
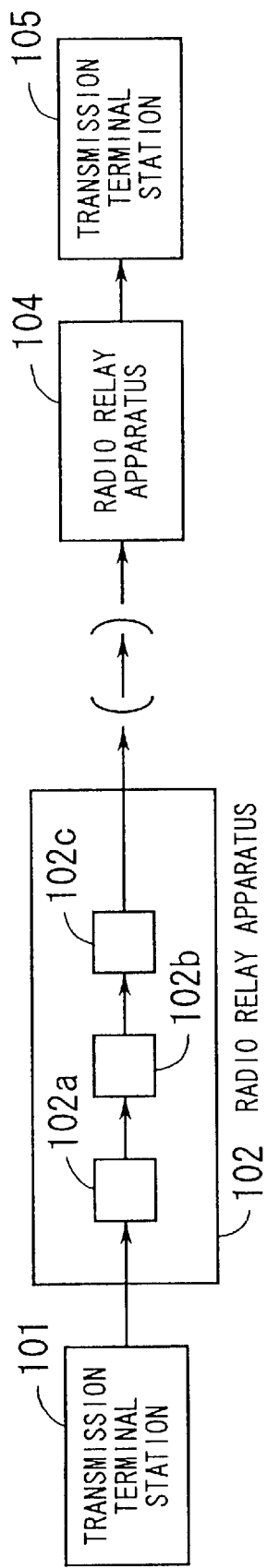
FIG. 9 is a diagram showing the configuration of a conventional optical transmission system.

FIG. 7 is a diagram showing the fourth embodiment. The arrangement of the fourth embodiment is basically identical with that of the first embodiment; therefore, identical reference numerals are used to designate identical elements and a description of such elements is omitted.

In the fourth embodiment, an error counting section 12h samples B2 byte information from the received transmission signal. The sampled data is checked bit by bit to count the number of bits indicating the value "1". The value thus counted is supplied to an inserting section 12i, which then inserts the count value into vacant bytes of data which is the result of recomputation, so that the count value is transmitted, together with the result of recomputation, to the radio relay apparatus 13.

In the radio relay apparatus 13, a B2 parity error detecting section 13a obtains the count value from the transmitted signal. If the count value equals "0", the result of recomputation is regarded as normal, and if the count takes the value"1" or more, it is judged that the data which is a subject of B2 parity computation is erroneous.

As described above, according to the present invention, B2 byte information is sampled from the received transmission signal and also B2 parity recomputation is performed so that the difference between the two items of data can be utilized. Consequently, even in the case where the pointer value is reset in the radio relay apparatus, the same value of B2 bytes as received from a transmitting-side terminal station can be sent to a receiving-side terminal station.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio relay apparatus complying with Synchronous Digital Hierarchy interface standard (SDH), comprising:

B2 sampling means for sampling B2 byte information included in transmission information sent from a transmission terminal station;

B2 recomputing means for performing B2 parity computation again for the transmission information, said B2 parity computation being initially performed by the transmission terminal station;

adding means for adding bit by bit the data sampled by said B2 sampling means to data obtained by said B2 recomputing means; and transmitting means for transmitting a sum obtained by said adding means to a subsequent radio relay apparatus.

2. The radio relay apparatus according to claim 1, which further comprises error detecting means provided in the subsequent radio relay apparatus for judging based on the sum transmitted from said transmitting means that the data obtained by said B2 recomputing means and which corresponds to a bit having a value of "1" is erroneous.

3. A radio relay apparatus complying with Synchronous Digital Hierarchy interface standard (SDH), comprising:

B2 sampling means for sampling B2 byte information included in transmission information sent from a transmission terminal station;

B2 recomputing means for performing B2 parity computation again for the transmission information, said B2 parity computation being initially performed by the transmission terminal station; and transmitting means for adding predetermined data to data obtained by said B2 recomputing means in accordance with the data sampled by said B2 sampling means, and transmitting resultant data to a subsequent radio relay apparatus together with the data sampled by said B2 sampling means.

4. The radio relay apparatus according to claim 3, which further comprises error detecting means provided in the subsequent radio relay apparatus for checking individual items of data transmitted from said transmitting means to detect a change of each bit of the data obtained by said B2 recomputing means by using as reference data sampled by said B2 sampling means, and wherein when an inverted bit is detected, the recognition means judges that the data obtained by said B2 recomputing means and which corresponds to the inverted bit is erroneous.

5. A radio relay apparatus complying with Synchronous Digital Hierarchy interface standard (SDH), comprising:

B2 sampling means for sampling B2 byte information included in transmission information sent from a transmission terminal station;

B2 recomputing means for performing B2 parity computation again for the transmission information, said B2 parity computation being initially performed by the transmission terminal station; and transmitting means for inserting the data sampled by said B2 sampling means into data obtained by said B2 recomputing means and transmitting resultant data to a subsequent radio relay apparatus.

6. The radio relay apparatus according to claim 5, which further comprises error detecting means provided in the subsequent radio relay apparatus for judging based on individual items of data transmitted from said transmitting means that the data obtained by said B2 recomputing means and which corresponds to a bit indicative of a difference between two corresponding items of data is erroneous.

7. A radio relay apparatus complying with Synchronous Digital Hierarchy interface standard (SDH), comprising:

B2 sampling means for sampling B2 byte information included in transmission information sent from a transmission terminal station;

B2 recomputing means for performing B2 parity computation again for the transmission information, said B2 parity computation being initially performed by the transmission terminal station; and transmitting means for inserting the data sampled by said B2 sampling means into data obtained by said B2 recomputing means and transmitting resultant data to a subsequent radio relay apparatus.

8. The radio relay apparatus according to claim 7, which further comprises error detecting means provided in the subsequent radio relay apparatus for judging that the data obtained by said B2 recomputing means is erroneous when the count value transmitted from said transmitting means indicates a value of "1" or more.

* * * * *